United States Patent [19]

Shelby et al.

[11] 4,110,297

[45] * Aug. 29, 1978

[54] WIRE ENAMEL WITH LOW SOLDERING TEMPERATURE

[75] Inventors: Thomas A. Shelby; Shelby W. Gallien, both of Fort Wayne, Ind.

[73] Assignee: Rea Magnet Wire Co., Inc., Fort Wayne, Ind.

[ * ] Notice: The portion of the term of this patent subsequent to Oct. 26, 1993, has been disclaimed.

[21] Appl. No.: 722,823

[22] Filed: Sep. 13, 1976

Related U.S. Application Data

[63] Continuation-in-part of Ser. No. 531,458, Dec. 11, 1974, Pat. No. 3,988,251.

[51] Int. Cl.² .......................... C08K 5/01; C08K 5/13; C08L 75/04; H01B 3/20
[52] U.S. Cl. .............. 260/33.4 P; 252/63.2; 252/63.7; 260/33.4 UR; 260/33.6 UB; 428/379
[58] Field of Search ............... 260/33.4 P, 33.4 UR, 260/33.6 UB; 428/379; 252/63.7, 64

[56] References Cited

U.S. PATENT DOCUMENTS

| | | | |
|---|---|---|---|
| 3,174,950 | 3/1965 | Cordier | 428/379 |
| 3,245,960 | 4/1966 | Curtis | 428/379 |
| 3,514,500 | 5/1970 | Osmond et al. | 260/34.2 |
| 3,652,471 | 3/1972 | Sattler | 260/33.4 UR |

*Primary Examiner*—Allan Lieberman
*Attorney, Agent, or Firm*—William J. O'Rourke, Jr.

[57] ABSTRACT

A wire enamel coating composition capable of forming an insulative coating on a wire to provide a solderability of less than 1 second at temperatures as low as 285°–315° C and a thermoplastic flow temperature of at least 230° C comprising a predetermined ratio of a polyurethane ester resin having a free hydroxyl content of 4–10% by weight and a blocked isocyanate; at least one aromatic solvent, and a catalyst.

10 Claims, 1 Drawing Figure

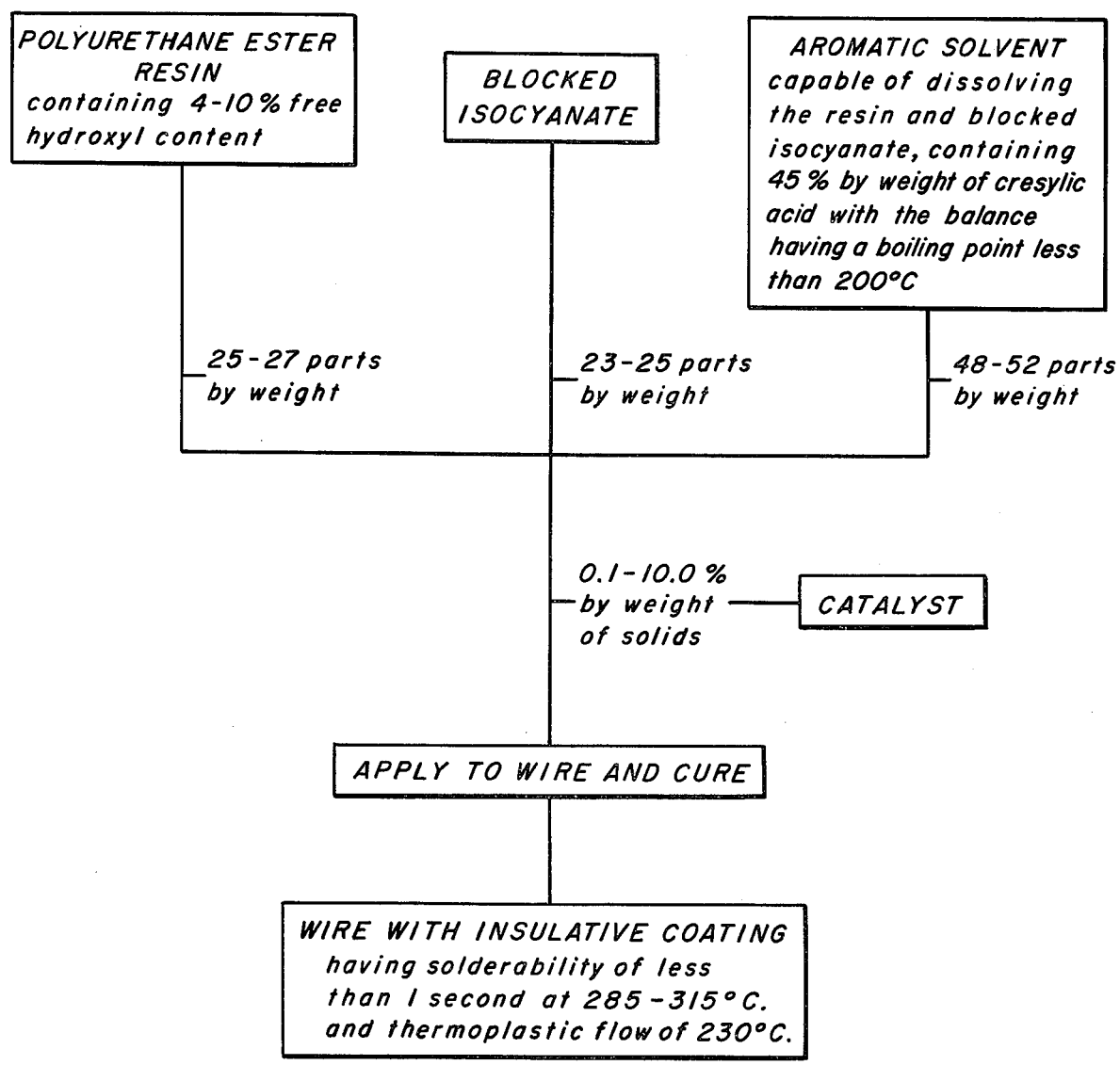

WIRE ENAMEL WITH LOW SOLDERING TEMPERATURE

RELATED APPLICATIONS

This application is a continuation-in-part of Ser. No. 531,458, filed Dec. 11, 1974, now U.S. Pat. No. 3,988,251.

BACKGROUND OF THE INVENTION

This invention relates to wire enamel. More particularly, this invention relates to a coating composition capable of forming an insulative coating on wire to provide a very low temperature solderability while maintaining satisfactory insulative properties.

Requirements for fast and reliable soldering require increased use of preassembled components which are subsequently dipped into a solder pot to decompose the insulation from the wire, for example, and cause it to be at the same time soldered to a terminal. The speed requirement in addition to the presence of other plastic materials in the preassembled package necessitates an insulated coating which will be capable of melting or disintegrating at as low a temperature as possible. Conversely, however, increased safety requirements mandate the need for an insulative material which will be capable of withstanding temporarily higher than normal operating temperatures such as, for example, when a short occurs causing a wire to heat up. The latter property can be defined as thermoplastic flow. Prescribed testing procedures by the National Electrical Manufacturers Association (NEMA) define the conditions under which the thermoplastic flow temperature of a wire is determined.

Basically, the need for a low solderability temperature is, for most materials, the antithesis of the equally important need for good insulation properties such as a high thermoplastic flow temperature. Quite surprisingly, however, we have found a particular coating composition which provides a surprisingly low solderability temperature yet provides a satisfactory thermoplastic flow temperature.

SUMMARY OF THE INVENTION

In accordance with the invention, a wire enamel coating composition capable of forming an insulative coating on a wire is provided, characterized by a solderability of less than 1 second at a temperature of about 285°–315° C and a thermoplastic flow temperature of at least 230° C and comprising 25-27 parts by weight of a polyurethane ester resin containing 4-10% by weight free hydroxyl content and 23-25 parts by weight of a blocked isocyanate, with the balance of the parts, i.e., 48-52 parts by weight of a solvent capable of dissolving the resin and the blocked isocyanate and containing at least 45% by weight of cresylic acid. One-tenth of one percent ot ten percent, by weight of the solids, of a catalyst is used to accelerate the reaction between the polyurethane ester resin and the blocked isocyanate.

BRIEF DESCRIPTION OF THE DRAWING

The sole drawing of the invention is a flowsheet illustrating the components.

DESCRIPTION OF THE PREFERRED EMBODIMENTS

In accordance with the invention, a wire enamel is prepared by mixing together about 25-27 parts by weight of a polyurethane ester resin containing 4-10% by weight free hydroxyl content with about 23-25 parts by weight of a blocked isocyanate. The resulting solids are dissolved in an aromatic solvent solution containing about 48-52 parts by weight of the total solution.

The polyurethane ester resin preferably is a reaction product of a diisocyanate such as toluene diisocyanate (TDI) with an ester such as the esterification product of a diol with a dicarboxylic acid wherein the esterification is carried out with a sufficient excess of diol to provide an ester having a very low acid number resulting in a hydroxyl content in the reaction product of the diisocyanate with the ester of 4-10%.

Examples of materials which can be used to form the urethane ester resins include diisocyanates including aromatic diisocyanates such as toluene diisocyanate, aliphatic diisocyanates such as tetramethylene diisocyanate, and cycloaliphatic diisocyanates such as methyl cyclohexane diisocyanate; longer chain diols including aliphatic diols such as 1, 4 butane diol and 1, 6 hexane diol, and ester diols such as the reaction product of two moles of ethylene glycol with one mole of adipic acid, or similar ether diols; and saturated dicarboxylic acids including aromatic discarboxylic acids capable of forming an anhydride such as, for example, orthophthalic acid or tetrahydrophthalic sebacic acids. Specific examples of such esters useful in the practice of the invention are E-339 Polyurethane Ester available from the Mobay Chemical Company or Desmodur D-70 available from Farbenfabriken Bayer.

The blocked isocyanate may be a diisocyanate having both of the isocyanate groups blocked. An example of such material would be the reaction product of a molar amount of trimethylol propane with 3 moles of toluene diisocyanate with the free isocyanate groups of the reaction product blocked by an appropriate blocking agent such as phenol or other equivalent hydroxy compounds. Other blocked isocyanates useful in the invention are described in U.S. Pat. No. 3,650,788. Examples of materials commercially available include Mondur S available from the Mobay Chemical Company or PDG 710 available from the P. D. George Company of St. Louis.

The aromatic solvents may comprise one or more of a number of materials containing at least 45% by weight of cresylic acid and must provide sufficient solubility for the urethane and isocyanate resins discussed above. The balance of the solvent may be one or more aromatic hydrocarbons such as xylene, toluene, benzene or the like.

In a preferred embodiment, the solvent comprises 45-70% by weight of cresylic acid 0-50% by weight of WES oil, and 0-30% by weight of xylene wherein the sum total amount of WES oil and xylene equals 30-55% by weight. In this preferred embodiment, cresylic acid has a boiling point of at least 200° C, and the balance of the solvent has a boiling point of less than 200° C.

In an alternate embodiment, the solvent in the coating composition comprises approximately 70% by weight of cresylic acid, and approximately 30% by weight of xylene.

In the most preferred embodiment, the aromatic mixture of solvents comprises about 48-52% by weight of cresylic acid, about 24-26% by weight of a high boiling aromatic solvent known in the trade as WES oil (wire enamel solvent), and 24-26% by weight of xylene. WES oil is a semi-refined coal tar distillate, straw to dark amber in color, characterized by distillation of 10% to not below 165° C, 70% to not above 190° C and 95% to not above 235° C.

An appropriate catalyst is used to promote the reaction of the polyurethane ester resin with the blocked isocyanate. Such catalysts are well known to those skilled in the art. The catalyst is added in an amount of about 1% by weight of the solids. A preferred catalyst is Rubber Accelerator 808, a butyraldehyde-aniline condensation product available from the E. I. duPont de Nemours Company.

To further illustrate the invention, a wire enamel coating composition was made using 26 parts by weight of E-339 Polyurethane Ester Resin, 24 parts by weight Mondur S blocked isocyanate resin, 25 parts by weight cresylic acid, 12.5 parts by weight WES oil, and 12.5 parts by weight xylene. To this composition was added 1% by total weight of the E-339 and Mondur S of duPont Rubber Accelerator Catalyst 808. The composition was applied to a No. 37 AWG copper wire to provide an average coating thickness of 0.00035 inch or a build of 0.0007 inch. The coating was cured in a conventional continuous wire enameling oven with a bottom oven zone to top oven zone temperature range of 120°–350° C during a residence time of 15 seconds per coat with 3 coats applied. The sample of the coated wire was then assembled to a test fixture and dipped into a soldering pot at 302° C (575° F). The enamel was found to disintegrate in less than 1 second at this temperature.

To further test the efficacy of the coating composition, the standard NEMA tests such as continuity, dielectric strength, heat shock and thermoplastic flow, were all successfully conducted on the samples. The standard NEMA test (MW-1000-1973-50.1.1) for thermoplastic flow was conducted comprising placing two wires coated with the coating composition in contact at right angles with each wire connected to one terminal of 110-volt A.C. power supply. A 50 gram weight was placed on the wire and the assembly placed in an oven and the temperature slowly raised in increments of about 3°–5° C per minute. The wires were connected to an alarm which would sound when the wires touched one another, signifying that both of the wires had cut through the insulative coating. On the average, the alarm went off at about 230° C indicating that the wire enamel insulative coating was able to withstand a temperature of up to that point before cutting through.

What is claimed is:

1. A wire enamel coating composition capable of forming an insulative coating on a wire characterized by a solderability of less than 1 second at a temperature of about 285°–315° C and a thermoplastic flow temperature of at least 230° C and comprising:

(a) 25–27 parts by weight of a polyurethane ester resin containing 4–10% by weight free hydroxyl content;
 (b) 23–25 parts by weight of a blocked isocyanate;
 (c) about 48–52 parts by weight of a solvent capable of dissolving said resin and said blocked isocyanate and containing at least 45% by weight of cresylic acid, with the balance of the solvent having a boiling point of less than 200° C; and
 (d) 0.1 to 10.0% by weight of solids of a catalyst.

2. The wire enamel coating composition of claim 1 wherein said polyurethane ester resin comprises the reaction product of a diol, a saturated dicarboxylic acid and a diisocyanate.

3. The composition of claim 2 wherein said diol has at least 4 carbon atoms.

4. The composition of claim 2 wherein said diisocyanate comprises toluene diisocyanate.

5. The composition of claim 2 wherein said saturated dicarboxylic acid comprises a diacid capable of forming an anhydride.

6. The composition of claim 5 wherein said saturated dicarboxylic acid capable of forming an anhydride is selected from the class consisting of orthophthalic acid, tetrahydrophthalic acid, hexahydrophthalic acid, trimellitic acid and anhydrides of said acids.

7. The coating composition of claim 1 wherein said blocked isocyanate comprises the reaction product of trimethylol propane, toluene diisocyanate and phenol.

8. The coating composition of claim 1 wherein the balance of said solvent is selected from the group consisting of:

(a) a semi-refined coal tar distillate characterized by distillation of 10% to not below 165° C, 70% to not above 190° C and 95% to not above 235° C;
 (b) xylene; and
 (c) mixtures thereof.

9. The coating composition of claim 8 wherein said solvent comprises:

(a) 50–70% by weight of cresylic acid;
 (b) 0–50% by weight of a semirefined coal tar distillate characterized by distillation of
   (1) 10% to not below 165° C,
   (2) 70% to not above 190° C, and
   (3) 95% to not above 235° C; and
 (c) 0–30% by weight of xylene, wherein the sum total amount of said coal tar distillate and xylene equals 30–50% by weight.

10. The coating composition of claim 8 wherein said solvent comprises approximately 70% by weight of cresylic acid and approximately 30% by weight of xylene.

* * * * *